Nov. 14, 1967 H. NERWIN 3,352,042

FILM STORAGE SYSTEM

Filed Jan. 25, 1965 2 Sheets-Sheet 1

HUBERT NERWIN
INVENTOR.

BY R. Frank Smith
Lloyd F. Seebach
ATTORNEY AND AGENT

HUBERT NERWIN
INVENTOR.
BY R. Frank Smith
Lloyd F. Seebach
ATTORNEY AND AGENT

United States Patent Office 3,352,042

Patented Nov. 14, 1967

3,352,042

FILM STORAGE SYSTEM

Hubert Nerwin, Rochester, N.Y., assignor to Eastman Kodak Company, Rochester, N.Y., a corporation of New Jersey Filed Jan. 25, 1965, Ser. No. 427,797

11 Claims. (Cl. 40—72)

The present invention relates to the storage and retrieval of recorded information. More particularly, the invention relates to selectively separating a predetermined information-bearing member from a plurality of similar members.

Spacious storage needs for a continually growing quantity of recorded information have been greatly diminished by microreproduction of the information-bearing records. Microreproducing such records, for example by microfilming, has also facilitated the retrieval and use thereof and places a vast storehouse of information at a user's fingertips. Probably the most well-known and widely used type of microcopy storage file comprises long strips of microfilm which are wound on reels. Such a file provides in most instances a highly satisfactory arrangement from which information is easily retrieved.

There is a continuing need, however, for improved methods and apparatus relating to specific aspects and problems in microcopy storage and retrieval. For example, the value of many record files is dependent upon the file containing only current information. Accordingly, it is desirable to have a file which can be easily updated. Where the file comprises a long strip wound on a reel it is often impractical, both in cost and convenience, to delete or add limited amounts of information to the file. Therefore, short strips of information-bearing microcopy are being used to advantage in current status files because of the simplicity of adding or deleting a single unit to update the file.

The present invention relates to the retrieval of a particular strip from such a file, and, as is hereinafter more fully described, can be used with strips or sheets of any width. For ease of illustration therefore, the term "chip" is used in this specification and is intended to mean any information carrying member whether it is a transparent or opaque sheet, strip card or the like.

The present invention comprises a method and apparatus for segregating an information-bearing portion of a predetermined chip from a file containing a plurality of chips, and for selectively positioning said portion so that particular information carried thereon can be viewed. In one of its more specific aspects the novel method comprises sequentially riffling or fanning one end of each chip in a bundle of superimposed chips until the one end of a predetermined chip is moved relatively free from the bundle, moving the bundle relative to a separator to deflect the information-bearing portions of all other chips in the bundle away from the predetermined chip, and then moving the information-bearing portion of said predetermined chip into a viewing position.

One object of the present invention is to provide an improved method and apparatus for retrieving recorded information.

Another object of the invention is to provide a method and apparatus for segregating one chip from a record file formed from a plurality of similar chips.

Still another object of the invention is to provide a method and apparatus for retrieving and selectively positioning for viewing an information-bearing portion of a predetermined chip without completely removing said chip from a file composed of a plurality of similar chips.

Yet another object of the present invention is to provide a compact, relatively inexpensive to manufacture, and easy to use apparatus for retrieving recorded information.

Still other objects of the present invention will become readily apparent to those skilled in the art from the following description, with reference to the accompanying drawings in which like characters denote like parts.

Figure 1:
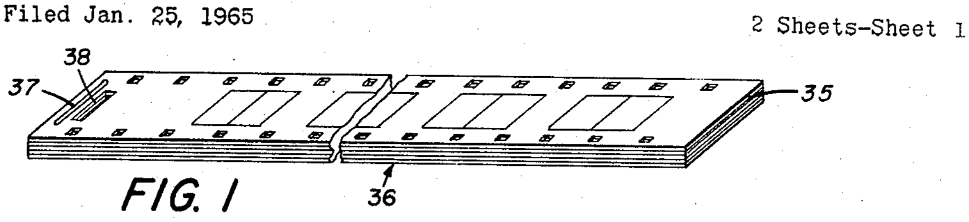
FIG. 1 is a perspective view of a record file comprising a bundle of superimposed chips, each chip bearing a single column of micro-images.

Referring to a preferred embodiment of the present invention, a storage and retrieval cartridge 11 comprises a core portion 13 which defines a central, substantially cylindrical cavity 15, and arms 17, 19 and 21. The arms have formed therein duct-like cavities 23, 25 and 27, respectively, which tangentially meet the central cavity 15 so as to provide unobstructed guideways to receive the chips during retrieval. A spindle 29 located at the center of cavity 15 is secured to one end wall of the cartridge 11 and provides an axis of rotation for a bundle of chips in a manner hereinafter described.

Figure 4:
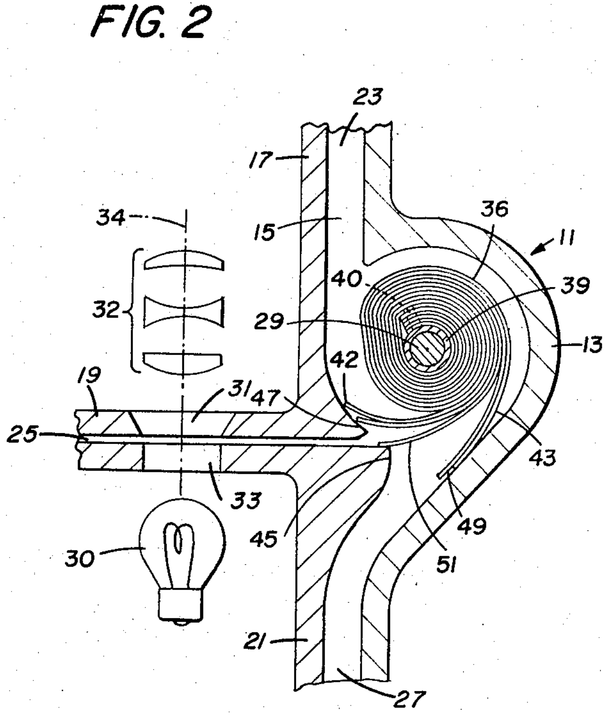

As illustrated in FIG. 4, arm 19 is the viewing arm of the cartridge. Where the cartridge 11 is to be used with a record file comprised of transparencies, opposing apertures 31 and 33 are formed in arm 19 and the cartridge is supported in a projection apparatus so that the apertures are aligned with the optical projection axis 34 thereof. Thus a chip can be moved into cavity 25 to intersect said axis and present a predetermined micro-image carried thereon in registry with the optical axis 34 for projecting the image onto a viewing screen. The structure of the viewing arm of the cartridge, and the optical system of a projection apparatus, can be easily modified so as to accommodate opaque chips rather than transparent chips.

A plurality of superimposed, image-bearing chips 35 comprising a partial or complete record file are secured together at one end to form a bundle 36, such as by a clip or staple 37. Each chip can also be provided with an aperture or slot 38 for engaging a suitable nib on a core member. Preferably the clip is removable so that individual chips can be added to or deleted from the file. Although securing the chips together in this manner is not essential in order to practice the invention, it facilitates handling the file and manipulating the chips as hereinafter described.

Figure 3:
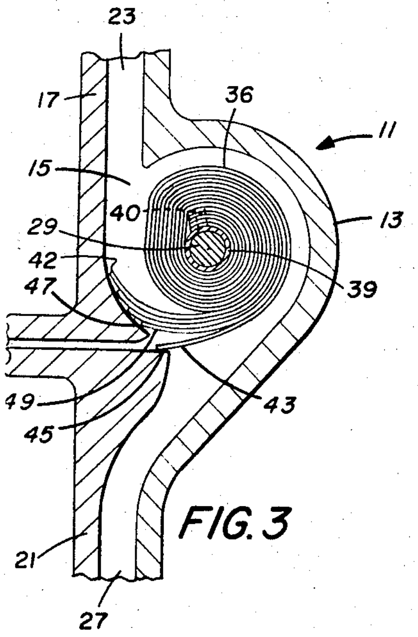
FIGS. 3, 4 and 5 are sectional elevation views of one embodiment of the present invention, each view showing a record file in different positions during the retrieval and positioning of a particular chip.
Figure 5:
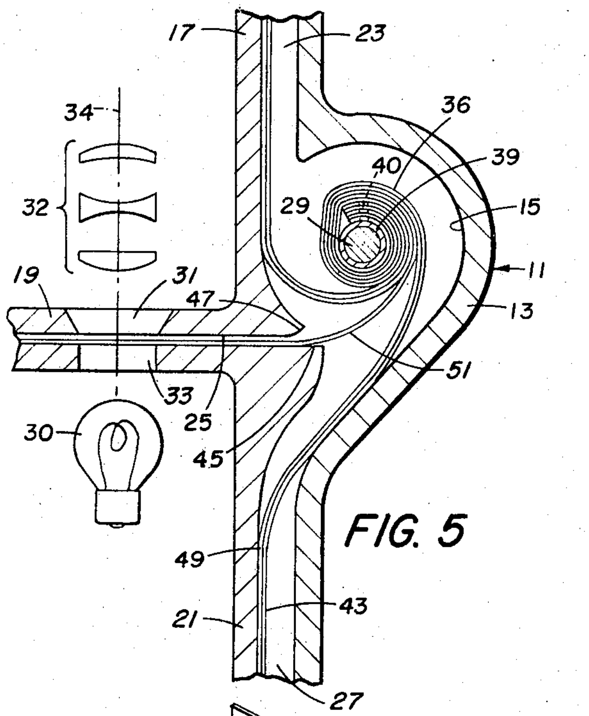
Figure 7:
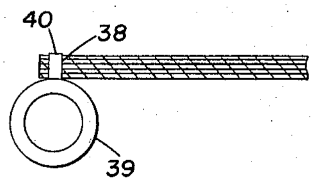
FIG. 7 is a side view showing a bundle of chips attached to a core member.

The secured end of the bundle of chips 36 is attached to a tubular core member 39 by means of a nib 40 which engages the aligned slots 38 in a bundle of chips. The chips are then rolled around member 39 with the secured ends of the chips at the center of the roll. Thus, the bundle of chips 36 form a number of substantially concentric rings or, if the chips are sufficiently long to more than encircle member 39, each chip will tend to form a spiral as it overlaps the secured end of the bundle. It is preferable that the chips be uniform in length but they can be of any relative length so long as a stepped configuration is formed around the outer periphery of the spiral roll by the ends 42 as shown in FIGS. 3, 4 and 5. The thickness and relative length of the individual chips is exaggerated in the drawings so as to better illustrate the invention.

A rolled bundle of chips 36 can be either permanently or removably enclosed in the cartridge 11. For example, a viewing apparatus having a light source 30 and a lens system 32 arranged along the optical axis 34, such as a projection reader, can be fabricated so that the cartridge 11 is removable therefrom, or such that a roller file is inserted into and removed from a cartridge at will. The spindle 29 which is located in the center of cavity 15 telescopes into member 39 so that member 39 is rotatable thereon in either a clockwise or counterclockwise direction. An indexing knob or handle 41 is fixedly attached to member 39 to aid in rotating the latter and, hence, to indicate to a user as hereinafter described the relative positions of the chips in cavity 15.

Prior to retrieval of a specific chip, the rolled bundle or file of chips 36 is positioned in cavity 15 such that the unsecured end 42 of the outermost rolled chip 43 is held against lip 45, such as shown in FIG. 3. Handle 41 is indexed in any well known manner to indicate that the outermost chip 43, i.e. chip No. 1, is in position for retrieval. When chip 43 rests against lip 45, the next outermost chip is held by lip 47 on the opposite side of the opening to cavity 25. The relative positioning of the lips 45 and 47 to cavities 15 and 25 depends upon the length and thickness of the chips and is such that the end of only one chip is between the lips at any one time. For example, as shown in FIG. 3, the free end of the next outermost chip 49 will not slide off lip 47 and move between the lips until chip 43 has been riffled or moved past lip 45.

Figure 6:
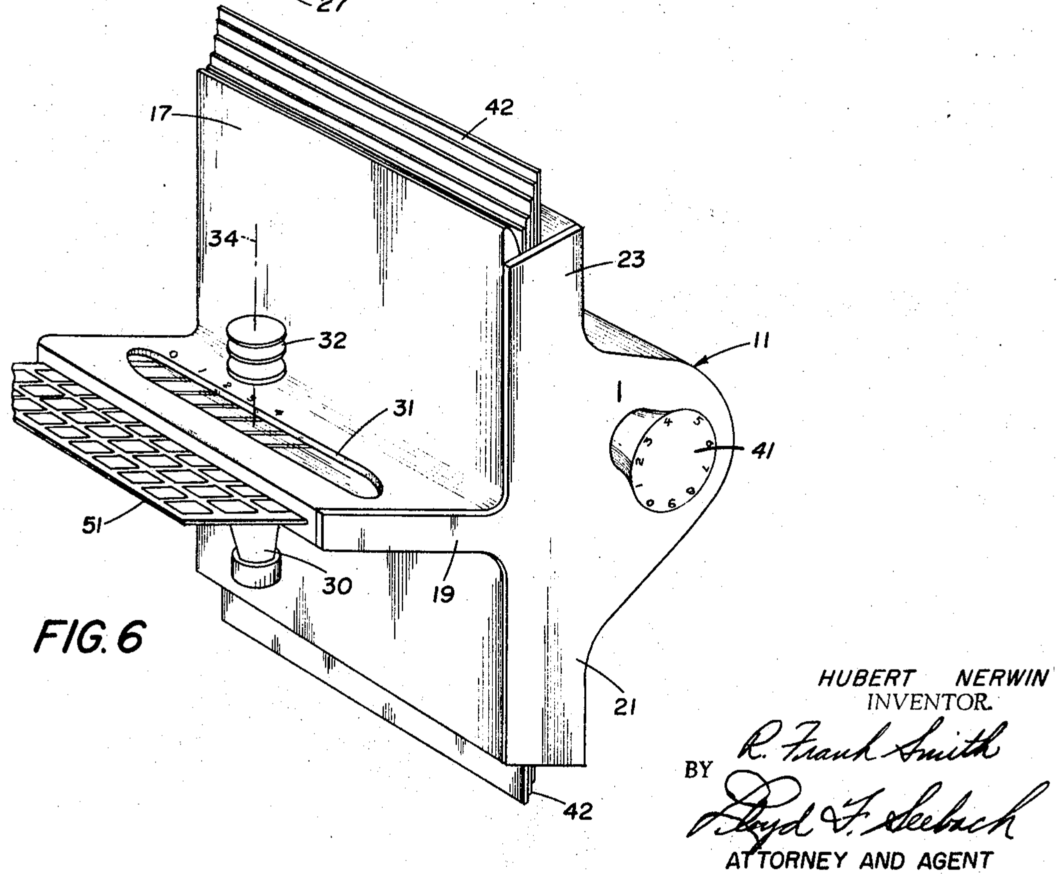
FIG. 6 is a perspective view of an apparatus for retrieving and selectively positioning an area or portion of a predetermined chip from the file of FIG. 2 relative to the optical axis of the apparatus.

Rotation of the knob 41 in a counterclockwise direction sequentially fans or riffles the stepped ends 42 of the chips 35 against the lips 47 and 45, respectively, and the numbers on the periphery of the knob, such as shown in FIG. 6, indicate to an operator which chip is between the lips 45 and 47. When the chip bearing the selected information is between the lips, for example chip 51 as shown in FIG. 4, the direction of rotation of the bundle is reversed. Because of the positioning of the end 42 of chip 51 relative to the lips 47 and 45, the lips function as a separator for segregating a portion of chip 51 from the file when the bundle 36 is rotated clockwise. Accordingly, chip 51 is guided into channel 25 for positioning a portion or area thereof in alignment with the optical axis 34 of a projector. The remainder of the file is guided to one side or the other of channel 25 and into guide channels 23 and 27. If the operator inadvertently overruns a predetermined chip bearing the wanted information, continued counterclockwise rotation of the knob 41 returns the wanted chip to retrieval position. After a selected image is viewed, the segregated chip is withdrawn from the viewing arm cavity 25 by counterclockwise rotation of knob 41.

Figure 2:
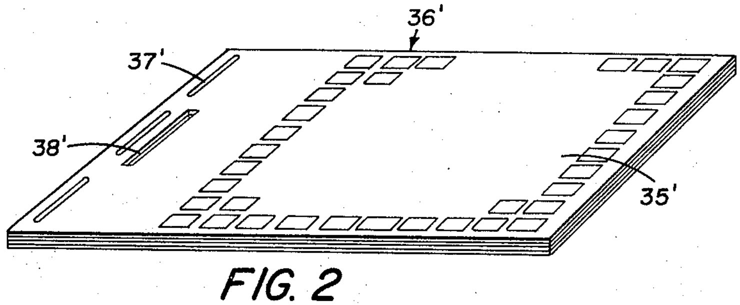
FIG. 2 is a perspective view of a record file comprising a bundle of superimposed chips, each chip bearing multiple columns of micro-images.

The cartridge 11 can have substantially the same configuration for use with chips 35′ bearing multiple columns of micro-images and formed into a bundle 36′ by clips 37′, such as illustrated in FIG. 2, except that the length of the cartridge must be compatible with that of the chips. Such a cartridge must be mounted so as to move any one of the several images in a column on a chip that have been aligned with the apertures in the viewing arm into registry with the optical axis 34.

Although the invention has been described in detail with particular reference to a preferred embodiment thereof, it will be understood that variations and modifications can be effected within the spirit and scope of the invention as described hereinabove and as defined in the appended claims.

The embodiments of the invention in which an exclusive property or privilege is claimed are defined as follows:

1. A method using a separator for retrieving a predetermined chip included in a file of similar, superimposed chips comprising:
 (a) sequentially riffling a common end portion of the superimposed chips in said file by moving said file in a first direction relative to and against said separator so as to locate the end portion of said predetermined chip in a position free from the remainder of said file; and
 (b) moving said file in a second direction relative to and against said separator, said moving step comprising deflecting away from said predetermined chip the superimposed segments of all other chips in said file and thereby isolating a lengthwise segment of said predetermined chip in a preselected location separated from the remainder of said chips.

2. A method for selectively retrieving for trans-illumination any given image from a group of images carried on a plurality of film strips which are interconnected on one end so as to form a bundle, said method comprising:
 (a) moving said bundle to selectively locate the unconnected end of the film strip bearing said given image; and
 (b) further moving said bundle and deflecting the other film strips in said bundle away from the film strip bearing said given image so as to position said given image in registry with a projection station without disconnecting said located film strip from said interconnected film strips.

3. A method using a separating device for retrieving a lengthwise segment of one chip included in a bundle of superimposed chips which are attached together at one end thereof, comprising:
 (a) rolling the bundle from the attached end thereof into a circular configuration such that the end lengths of the chips are exposed around the periphery of the roll in a stepped relation;
 (b) rotating said rolled bundle in a first direction so that each exposed length is successively riffled against said separating device until the end length of said one chip is disposed in a predetermined location relative to said separating device; and
 (c) rotating said bundle in a second direction and into contact with said separating device and deflecting the exposed ends of the other chips in said bundle to a location remote from said lengthwise segment of said one chip.

4. A method using a separator for retrieving a lengthwise segment of a predetermined chip from an array comprising a plurality of similar chips which are arranged in a substantially superimposed relation such that the end portions of the chips are exposed in a stepped relation, comprising:
 (a) selectively positioning said array so that the exposed end portion of said predetermined chip is at a predetermined location with respect to said separator; and
 (b) moving said array into engagement with said separator so that said lengthwise segment of said predetermined chip is directed out of its superimposed relation with respect to the other chips to a location isolated from the remainder of said chips and the other chips in said array are deflected away from said predetermined chip by said separator.

5. A method using a separator for selectively retrieving and positioning with respect to an information retrieval station, a given information area from a group of information areas located in a file comprising a plurality of similar chips arranged in a substantially superimposed relation such that the end portions of the chips are exposed in a stepped relation, said method comprising:
 (a) selectively positioning said file so that the end portion of the chip bearing said given information area is at a predetermined location with respect to said separator; and
 (b) moving said file towards and into engagement with said separator thereby deflecting the other chips in said file away from the chip bearing said given information area and positioning said given information area with respect to an information retrieval station.

6. An apparatus for retrieving a lengthwise segment of a predetermined chip from a file comprising a plurality of similar chips which are arranged in a substantially superimposed relation such that an end portion of each chip is exposed in a stepped relation, said apparatus comprising:

(a) separating means including means which define a passage for receiving a lengthwise segment of said predetermined chip and deflecting means for directing the remaining chips in said file away from said passage;

(b) means for supporting said file with the stepped end portions adjacent said operating means;

(c) means for selectively locating said file in one of several predetermined positions with respect to said separating means;

(d) means for moving said file from said selected predetermined position towards and into engagement with said separating means so that said remaining chips are directed away from said predetermined chip and said lengthwise segment of said predetermined chip is directed to a position remote from the remaining strips in said file.

7. The invention as defined in claim 6 wherein in said selected predetermined position, the exposed end portion of said predetermined chip is aligned with said passage and the exposed end portions of the remaining chips are deflected by said separating means away from said passage.

8. An apparatus for retrieving a lengthwise segment of a predetermined chip from a file comprising a plurality of similar chips which are arranged in a substantially superimposed relation such that an end portion of each chip is exposed in a stepped relation, said apparatus comprising:

(a) first means for directing said predetermined chip along a retrieval path and for deflecting the other chips in said file away from said predetermined chip;

(b) means for supporting said file with the stepped end portions adjacent said first means;

(c) means for selectively locating said file in one of several predetermined positions with respect to said first means;

(d) means for moving said file from said selected predetermined position towards and into engagement with said first means, whereby said lengthwise segment of said predetermined chip is directed to a location separate from the remaining strips in said file.

9. Apparatus for segregating one chip from a bundle formed from a plurality of similar superimposed chips, comprising:

means defining a chamber for receiving said bundle;

means defining a first opening into said chamber which is of a size sufficiently large for the largest of said similar chips in said bundle to pass therethrough;

means for moving a portion of said one chip through said opening; and means located adjacent to said opening for separating said one chip from said bundle and for deflecting all other chips in said bundle so as to prevent them from entering said opening as said portion is moved through said opening.

10. Apparatus in accordance with claim 9 wherein said separating means includes riffling means for sequentially fanning a common end of the chips in said bundle to locate said one chip.

11. A cartridge for storing a file comprising a plurality of similar superimposed chips and selectively retrieving a predetermined chip from said file, comprising:

a central portion defining a substantially cylindrical storage chamber for receiving said file;

a plurality of members extending from said central portion, each of said members defining a passage for at least one of said chips.

means adjacent one of said passages for segregating an end section of said predetermined chip within said one passage and apart from said other chips; and means for moving the end sections of said chips into contact with said segregating means so that a lengthwise segment of said predetermined chip is moved within said one passage and the remaining chips are deflected into another guide passage.

References Cited

UNITED STATES PATENTS 2,552,448 5/1951 Ortendahl ------------ 40—72

EUGENE R. CAPOZIO, *Primary Examiner.*

W. GRIEB, *Assistant Examiner.*